United States Patent [19]

Studtmann

[11] Patent Number: 4,511,834
[45] Date of Patent: Apr. 16, 1985

[54] CONTROL AND STABILIZING SYSTEM FOR DAMPERLESS SYNCHRONOUS MOTOR

[75] Inventor: George H. Studtmann, Mt. Prospect, Ill.

[73] Assignee: Borg-Warner Corporation, Chicago, Ill.

[21] Appl. No.: 452,559

[22] Filed: Dec. 23, 1982

[51] Int. Cl.³ .............................................. H02P 7/42
[52] U.S. Cl. .................................. 318/700; 318/717; 318/723
[58] Field of Search ........................ 318/705, 720–723, 318/700, 714, 715, 717, 798–811; 363/74

[56] References Cited

U.S. PATENT DOCUMENTS

| | | | |
|---|---|---|---|
| 3,551,766 | 12/1970 | Stemmler | 318/179 |
| 3,612,970 | 10/1971 | Sofan | 318/721 |
| 3,840,799 | 10/1974 | Macko et al. | 321/5 |
| 4,088,932 | 5/1978 | Okuyama et al. | 318/721 |
| 4,186,435 | 1/1980 | Cailloux | 363/37 |
| 4,230,979 | 10/1980 | Espelage et al. | 318/721 |
| 4,246,528 | 1/1981 | Nakajima | 318/721 |
| 4,255,695 | 3/1981 | Plunkett et al. | 318/723 |
| 4,258,302 | 3/1981 | Plunkett | 318/723 |
| 4,264,853 | 4/1981 | Morishita | 318/805 |
| 4,321,518 | 3/1982 | Akamatsu | 318/810 |
| 4,327,315 | 4/1982 | Kawada et al. | 318/803 |
| 4,328,454 | 5/1982 | Okuyama et al. | 318/803 |
| 4,375,612 | 3/1983 | Wirth | 318/803 |
| 4,394,610 | 7/1983 | Dolland | 318/803 |
| 4,437,050 | 3/1984 | Overzet | 318/803 |

Primary Examiner—E. A. Goldberg
Assistant Examiner—A. Evans
Attorney, Agent, or Firm—James E. Tracy

[57] ABSTRACT

Stabilized operation of a damperless synchronous motor, which is driven by a voltage source inverter energized by a d-c bus voltage, is obtained under transient conditions, such as during sudden variations of load torque, in order to maintain the torque angle in the motor relatively stable at all times and within the stability limit. This is achieved by employing transient changes in either the d-c bus voltage, the d-c bus current or the motor voltage, which changes reflect transient variations of the torque angle, to rapidly adjust the inverter frequency as necessary to hold the torque angle reasonably constant. For example, if there is an abrupt load increase on the motor, the bus voltage tends to drop and the motor tends to slow down, the torque angle thereby tending to increase. The extent to which the angle tends to increase will, however, be rapidly reduced by dynamically decreasing the inverter frequency so that the rotating magnetic flux or mmf, produced by the stator windings of the motor, slows down to preserve the desired torque angle. When there is a normal variation in load demand, necessitating a different steady state motor speed, a set point voltage may be varied to change the amplitude and frequency of the inverter output voltage to the steady state levels needed to drive the motor at the new required speed.

22 Claims, 5 Drawing Figures

CONTROL AND STABILIZING SYSTEM FOR DAMPERLESS SYNCHRONOUS MOTOR

BACKGROUND OF THE INVENTION

This invention relates to a control system for controlling and stabilizing the operation of a damperless synchronous motor during transients or disturbances, as well as during steady state operation, to stabilize the motor's torque angle and maintain it within the stability limit.

In a synchronous motor, whether of the wound rotor (electromagnetic) type or permanent magnet rotor type, or brushless type, a rotating magnetic stator field produced by a set of stator windings causes the rotor to rotate in step or in synchronism with the stator field, the rotor speed or frequency thereby equalling the stator field frequency. The magnetic poles of the rotor are attracted by the revolving stator field and follow it in absolute synchronism producing torque by virtue of the magnetic interactions. There is no slip. The torque angle, namely the angle between the applied stator voltage and the no load back emf induced in the stator, may change somewhat (increasing with increasing mechanical load on the motor and decreasing with decreasing load) but the frequencies of the stator and rotor voltages will remain the same. Typically, the torque angle may be close to 0° at no load, and anywhere from 20° to 60° at full load. If too much mechanical load is added, the motor's torque angle increases to the extent that synchronous operation is lost. The angle at which this occurs is called the "stability limit" and is determined by the motor's parameters as well as the load and the voltage applied to the motor. For example, in some synchronous machines the stability limit may be around 90°. It is most desirable that the torque angle be held within the stability limit because if the limit is exceeded and the motor pulls out of synchronism (referred to as a "fault condition") the resulting transient torques and currents may be destructive.

Line voltage or load torque disturbances or transients may cause the rotor of a synchronous motor to hunt or oscillate as the rotor rotates. The oscillations may become so great that the stability limit is exceeded, this being particularly true when sudden load torque changes occur. For this reason, devices and systems of various types have been developed in the past to minimize the effects of these transients and disturbances in order to stabilize the operation of synchronous machines. One approach has been to employ a damper which is a shorted winding on the rotor. Such a damper winding tends to reduce the magnitude of any hunting or oscillation of the rotor.

The advent of the high powered static frequency changer has made it possible to design synchronous motor drive systems that do not require damper windings at all because the necessary damping function may now be provided electronically. The synchronous motor systems developed up to this time generally use forced commutated current source or voltage source inverters (some varieties of which are called brushless DC motor drives) or motor commutated, current source inverters. New in the art, as described by my companion patent application, Ser. No. 452,460, filed concurrently herewith, and entitled "Voltage-Controlled, Inverter-Motor System", are motor-commutated voltage source inverters which permit the design of very simple and inexpensive motor drives. The synchronous motors used with current source inverters still require damper windings to aid in the commutation process whereas the synchronous motors used with voltage source inverters do not require dampers for that purpose.

The elimination of the damper winding in the motor used in the voltage source drives provides several advantages. First, the motor becomes smaller, lighter, and less expensive. Secondly, the impedance to hamonic voltages generated by the non-sinusoidal inverter voltage is raised considerably, resulting in less harmonic current flow and an attendant reduction of harmonic loss. Therefore, motor efficiency is increased and cooling of the motor (particularly the rotor) becomes easier.

Prior to this invention, stabilization of a synchronous motor, operated from variable-frequency, voltage-controlled forced commutated inverters, has been obtained without a damper by using a shaft position sensor which is mounted on the motor shaft and effectively determines the position of the rotor flux or magnetic field. A signal from the shaft position sensor controls the inverter frequency to keep the stator mmf (magnetomotice force) from getting too far ahead of the rotor mmf. By "slaving" the inverter frequency to the position of the rotor, as determined by the sensor, the stator and rotor magnetic fields are maintained sufficiently close together to hold the torque angle relatively stable within the stability limit despite the presence of transients, disturbances, or sudden load torque changes. While such shaft position sensors are effective in providing stable drives, they do increase the cost and complexity of the synchronous motor and, moreover, if the system is hermetically sealed, wires from the sensor must be brought out through the sealed system.

As previously mentioned, motor-commutated voltage source inverters were unheard of prior to the development described in my co-pending application. Stabilization of the motors used in these system, although possible by the use of prior art position sensors may also easily be accomplished by the techniques presently being disclosed. The control system of the present invention constitutes a significant improvement over these prior systems in that stabilization of a synchronous motor, operating from a voltage source inverter, is achieved without requiring a damper or a motor shaft position sensor. The present invention maintains a stable torque angle well within the motor's stability limit by means of a very efficient system which is considerably simpler and less expensive in construction than the previous systems.

SUMMARY OF THE INVENTION

The control system of the invention controls and stabilizes the operation of a damperless synchronous motor driven by the output a-c voltage developed by a voltage source inverter from an adjustable d-c bus voltage received over a d-c bus from a controlled d-c power supply, both the d-c bus voltage and the torque angle in the motor being subject to transient variations under transient conditions. The control system comprises means for establishing the amplitude and frequency of the inverter output voltage at desired steady state levels. There are means for developing a control voltage which is a function of the d-c bus voltage or motor voltage and includes information indicating any sudden torque angle change. Stabilizing means, controlled by the control voltage, are provided for rapidly adjusting the inverter frequency anytime the torque angle tends to suddenly vary in order to reduce the extent to which the angle tends to change, thereby maintaining the torque angle relatively stable under transient conditions and within the stability limit of the motor.

In accordance with a more detailed aspect of the invention, advantage is taken of the fact that the d-c bus voltage and the motor voltage are inversely related to the torque angle. For example, if the d-c bus voltage and the motor voltage decrease, momentarily less current will flow into the motor, causing loss of torque and an increase in the torque angle as the motor slows down. A control voltage is made directly proportional to the d-c bus voltage or the motor voltage. The stabilizing means, which includes a volt-time integral controller, responds to the transient variations in the control voltage and effectively provides transient control over the inverter to rapidly change the inverter frequency so that it will vary in step with and in the same direction as the transient changes in the bus or motor voltage, thereby holding the torque angle relatively stable and preventing it from exceeding the motor's stability limit. In effect, the stabilizing means compares the inverter output voltage with the inverter frequency several times (six times in the illustrated embodiments) during each operating cycle of the inverter and, in response to each comparison, adjusts the inverter frequency so as to maintain at all times a constant value of volt-time integral on the motor winding and hence a fixed ratio of the inverter voltage relative to the inverter frequency, as a consequence of which the torque angle will be held relatively stable under dynamically changing or transient conditions as well as under static or steady state conditions.

DESCRIPTION OF THE DRAWINGS

The features of the invention which are believed to be novel are set forth with particularity in the appended claims. The invention may best be understood, however, by reference to the following description in conjunction with the accompanying drawings in which:

DESCRIPTION OF THE ILLUSTRATED EMBODIMENTS

It should be appreciated at the outset that the stabilization techniques herein disclosed do not depend for effective operation upon the form of voltage controller used. Any type of controller which may be used to control voltage as needed for other purposes such as speed or torque control will be suitable for use with this invention. Various DC-DC converters, AC-DC converters, etc. that are well-known in the art may be used. Additionally, the inverter voltage and the motor voltage may be held essentially constant while the frequency, hence speed, is varied such as is commonly done above the base speed of the motor. The only requirement on the voltage source is that there be sufficient regulation (change) with load variations to permit the stabilization techniques shown in FIGS. 1, 3 and 5 to function properly. The circuit of FIG. 4 may be used in cases where the d-c voltage is so solid that insufficient change occurs with load variations.

Expanding the previous discussion further to illustrate the general usefulness of the stabilization techniques to be described, the following observations may be made. As disclosed in the aforementioned co-pending patent application, Ser. No. 452,560, filed concurrently herewith, the d-c voltage applied to the terminals of a damperless motorcommutated inverter may be controlled by comparing the average d-c bus voltage to a reference voltage and using the error to cause the voltage controller to correct the error to acceptable limits. Altenatively, the regulator may be a current regulator which has low pass characteristics. Explaining the latter further, the regulator may be responsive to the average d-c current and, hence, cause the voltage control means to correct any error between this average current and a reference current and yet be unresponsive to the ripple currents generated by the motor back emf. This configuration then permits the current to fall naturally to zero, as in a true voltage source inverter, yet retain a current fed characteristic as far as average load current is concerned. This average current fed type of inverter has been implemented with a phase-controlled six-SCR input bridge, a modest d-c link or bus inductor and an output inverter consisting of six SCR's, and drives a damperless permanent magnet motor satisfactorily with stabilization techniques described herein. Thus, the term "voltage source inverter", as used herein and in the appended claims, embraces any inverter whose control system does not constrain the current to a fixed value as in a conventional current source inverter, but rather lets the current follow the essentially sinusoidal waveshape dictated by the back emf of the motor so that the current falls naturally to zero before the end of the half cycle. Even in view of the foregoing remarks, to insure a complete understanding of the system, a conventional phase-controller with an L-C filter is shown in FIG. 1 and will be fully described.

Figures 1, 2:
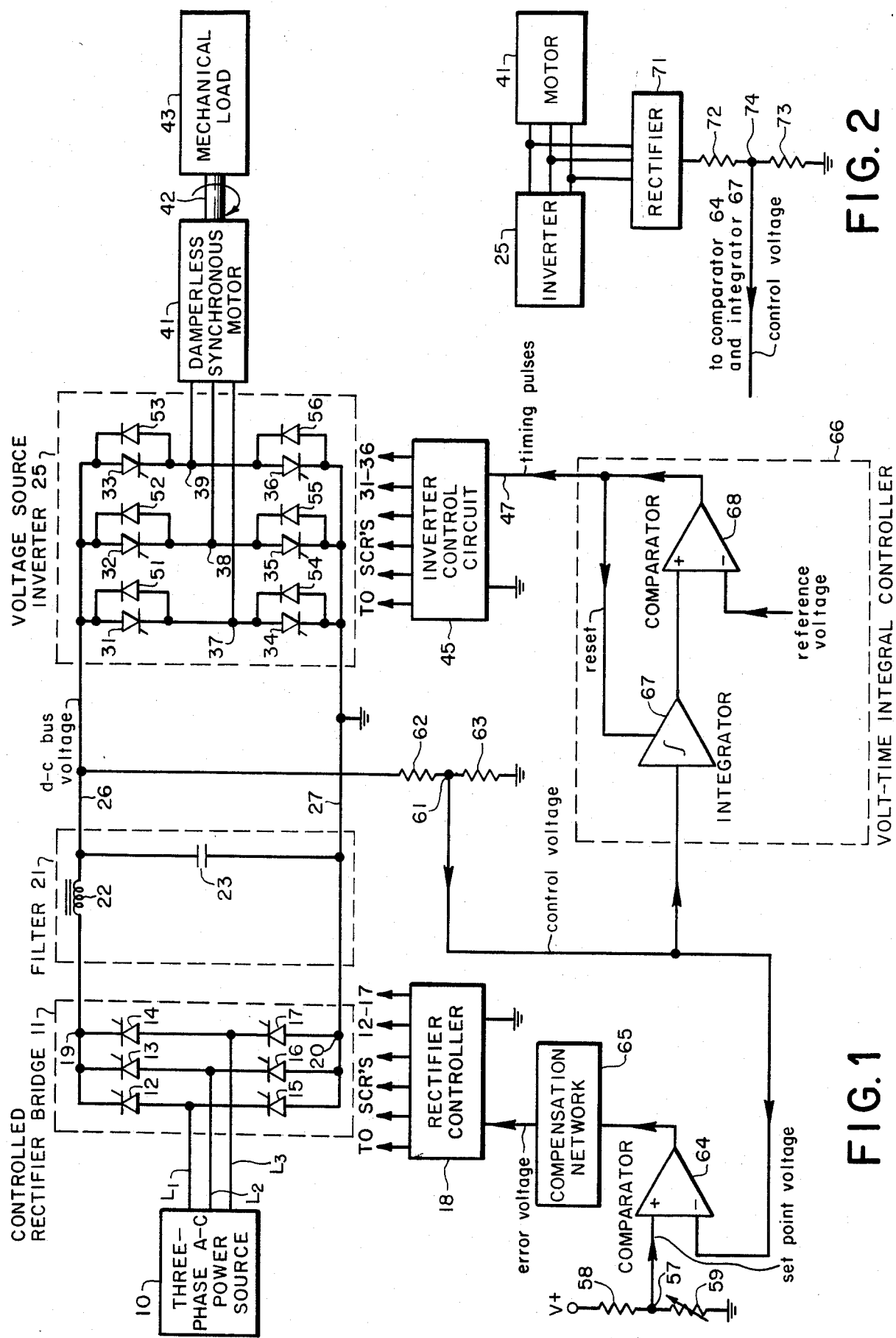
FIG. 1 schematically illustrates a control system, constructed in accordance with one embodiment of the present invention, and the manner in which that control system is coupled to an inverter-motor system to control and to stabilize the operation thereof, where the motor is a damperless synchronous motor which is operated from a voltage-controlled inverter.
FIG. 2 shows a portion of the control system of FIG. 1 modified in accordance with another embodiment of the invention.

Referring now to FIG. 1, line conductors $L_1$, $L_2$ and $L_3$ connect to a conventional three-phase A-C power source 10 which may be the usual A-C power mains, and thus provide three-phase a-c voltage, namely three alternating voltages varying in sinusoidal fashion and having the same amplitude and frequency but being phase-displaced with respect to each other by 120°. The frequency of the a-c line voltages will usually be either 50 or 60 cycles per second or hertz, and the magnitude of those voltages may take any appropriate value depending on the characteristics of the load to be energized or driven. Since there is no neutral line conductor from the A-C power supply, each of the three phase or line voltages is actually a line-to-line voltage and appears on one of the line conductors $L_1$, $L_2$ and $L_3$ relative to another one of the line conductors. The a-c energy received over the line conductors is rectified and converted to d-c power by a phase-controlled full wave rectifier bridge 11 which is of well-known construction.

Specifically, rectifier bridge 11 has a family of six silicon controlled rectifiers or SCR's 12-17 arranged in three pairs, to each of which pairs is applied a respective one of the three alternating phase or line voltages provided by three-phase A-C power source 10. The firing angles of the six SCR's are controlled, by gating signals from rectifier controller 18, in order to establish at the bridge's positive and negative output terminals (designated 19 and 20, respectively) a rectified voltage of a desired magnitude and in order to control the power supplied from source 10 and through bridge 11.

More specifically, the d-c voltage level at the bridge's output 19, 20 and the power flow through the bridge are adjusted by regulating the firing angles of the SCR's 12-17 during each half cycle of the applied a-c voltage. Each SCR in bridge 11 can conduct, during each half cycle of the voltage applied thereto from three-phase A-C power source 10, when the SCR's anode is positive relative to its cathode. However, conduction will not occur during a half cycle until gate current is supplied to the SCR's gate from rectifier controller 18. At that instant, the SCR fires into conduction, or turns on, and permits load current to flow therethrough for 120° at which time the firing of the oncoming SCR causes the conducting SCR to be reversed biased, turning it off. The greater the angle or time delay between the start of a half cycle and the firing of the SCR into conduction, the less will be the average rectified voltage across terminals 19 and 20 which, of course, will be of positive polarity at terminal 19 with respect to terminal 20.

Filter 21, comprising series-connected choke 22 and shunt-connected capacitor 23, filter the rectified voltage from the bridge to develop a filtered d-c voltage for application to voltage source inverter 25 over the d-c bus provided by lines 26 and 27. A positive-polarity d-c bus voltage will therefore appear on line 26 with respect to line 27 which is connected to a ground plane of reference potential or circuit common, zero volts in the illustrated embodiment of FIG. 1.

By controlling the firing angles of SCR's 12-17 the d-c bus voltage applied to inverter 25, via bus 26, 27, is controlled. It will be recognized that the controlled d-c power supply (namely rectifier bridge 11 and filter 21) may operate in response to single-phase rather than three-phase a-c energy. In the single-phase environment, line conductor $L_3$ and SCR's 14 and 17 would be omitted. Of course, a d-c bus voltage of positive polarity will still be produced on line 26 with respect to line 27.

Voltage source inverter 25 is of the three-phase type and may be one of two types as follows: For a forced commutated inverter, it may include six solid state switching devices, in the form of SCR's 31-36, and six diodes 51-56 arranged in three legs. Each leg consists of two SCR's and their associated diodes connected in series across the d-c bus conductors 26, 27. Commutation circuitry for the inverter SCR's is not shown as numerous satisfactory circuits exist in the art. Alternatively, the SCR's may be replaced by GTO's, bi-polar transistors or other devices that do not require commutation circuitry. Also, as is well-known, the diodes 51-56 function to provide a path for the flow of reactive energy and permit operation over a wide range of power factor.

Alternatively, voltage source inverter 25 for a motor commutated inverter may also consist of six SCR's 31-36 and six diodes 51-56, or in an even simpler configuration, may consist of only six SCR's 31-36 without the need for the reactive diodes 51-56. Both of these arrangements are described in my aforementioned copending patent application.

Additionally, the stabilization techniques described herein do not depend upon the particular inverter configuration for their utility. Consequently, single phase, two phase, six phase inverters, etc. may be used as well as inverters requiring center-tapped transformers or motor windings. These arrangements are well-known to one skilled in the art.

The circuit junctions 37, 38 and 39 of the three legs connect to the three windings of three-phase damperless synchronous motor 41, whose output shaft 42 drives some mechanical load 43. Three-phase motor 41 may be of the wound rotor type or the permanent magnet rotor type or other suitable synchronous motor. Additionally, as mentioned previously, the system may be configured as other than three phase; namely, single, two, six, etc. It is significant that the motor does not need a damper winding to obtain stability. It will be appreciated that while the optimum configuration does not require the use of damper windings on the motor, the system will work if damper windings are used for some other reason.

The necessary stabilization is accomplished by the present invention in a manner to be explained. By applying triggering or gating pulses to the gates of the six SCR's 31-36 at prescribed times and in a prescribed sequence, the d-c voltage across the d-c bus 26, 27 is effectively changed to three-phase a-c voltage as applied to the three windings of motor 41, thereby delivering three-phase alternating current to the three motor windings to effect rotation of the motor at a speed determined by and directly proportional to the frequency of the inverter output a-c voltage.

Control circuitry for supplying gating or triggering pulses to switch the SCR's 31-36 on and off in the correct sequence and at the correct times so as to provide the required three-phase a-c energy for rotating motor 41 and driving load 43 in the desired manner is well understood by those skilled in the art. In the illustrated embodiment of FIG. 1 the block 45 labeled "inverter control circuit" includes logic circuitry which, in response to periodically recurring timing pulses received over line 47, steers the gating or firing pulses to the correct SCR's in the inverter to turn them on in the required sequence. As is well-known, the six-SCR, three-phase inverter illustrated produces three phase-displaced six-step alternating voltages, each of which approximates a sine waveform, for application to respective ones of the three motor windings, the three quasi-sinusoidal varying voltages being phase displaced from each other by 120°. Hence, to develop the six-step waveforms, a different switching or firing must occur in the inverter every 60° of an operating cycle. In other words, after every 60° one of the SCR's that is conducting must be switched off and a new SCR must be fired into conduction. The switching times are determined by the timing pulses received over line 47. Each time a timing pulse is applied to the inverter control circuit 45, a different set of SCR's will become conductive, six consecutive timing pulses being required to complete each six-step operating cycle for each of the three phase-displaced alternating voltages produced by inverter 25. The inverter frequency is therefore determined by the repetition rate of the timing pulses. As will be made apparent, the timing pulses are generated in such a way that the desired inverter frequency is effectively established every 60° of each operating cycle in the inverter. In this way, if it is determined that a frequency change should be made in the inverter, such a change may be made within 60° of an operating cycle. This rapid frequency control over the inverter facilitates stabilization of the torque angle in motor 41 in a manner to be explained.

To control the operation of rectifier controller 18 to adjust the amplitude of the inverter output a-c voltage and to control the operation of control circuit 45 to regulate the frequency of the inverter voltage, an adjustable set point d-c voltage is provided at the circuit junction 57 of fixed resistor 58 and adjustable resistor 59. As will be made apparent, the set point voltage from voltage divider 58, 59 determines the steady state operating conditions and represents a desired amplitude and a desired frequency for the a-c voltage produced by inverter 25 for application to motor 41. Preferably, the set point will be selected to satisfy the speed demanded by mechanical load 43.

A control voltage, which is a function of the d-c bus voltage, is produced at the circuit junction 61 of the voltage divider formed by resistors 62 and 63 which are series-connected across the d-c bus 26, 27. More specifically, the control voltage is a scaled-down or reduced-amplitude version of the d-c bus voltage, and thus is directly proportional to the bus voltage. The control voltage is applied to the inverting or (−) input of comparator 64, the non-inverting or (+) input of the comparator being connected to junction 57 to receive the set point voltage. Comparator 64 therefore compares the set point voltage with the control voltage to provide an error voltage which is a function of the difference between the compared voltages. Rectifier controller 18, which is of well-known construction, responds to the error voltage, received from comparator 64 through a compensation network 65, to produce properly timed gating pulses for application to the gates of SCR's 12-17 to control the firing angles of the SCR's as required to establish the d-c bus voltage across lines 26 and 27 at the magnitude necessary to establish and to maintain the inverter output voltage at the desired steady state amplitude level. If the d-c bus voltage tends to vary from the requisite steady state level, the error voltage changes and causes rectifier controller 18 to automatically vary the firing angles as necessary to adjust the d-c bus voltage until the correct steady state amplitude level is re-established.

More particularly, during steady state conditions the error voltage will be essentially zero. If the bus voltage now tends to drop, for example, the control voltage decreases and this causes the error voltage to increase in a positive direction, thereby decreasing the firing angles of SCR's 12-17 to bring the bus voltage back up to the required steady state level, whereupon the error voltage returns to zero volts. On the other hand, an increase of the bus voltage from its required steady state level initiates automatic correction in the opposite sense, namely the error voltage increases from zero in a negative direction to cause the firing angles of the SCR's to increase until the bus voltage returns to its desired steady state level, at which time the error voltage will return to its zero amplitude level. As will be apparent to one skilled in the art, various compensation networks, integrators, etc. (65) may be used in the circuit to tailor the response characteristic of the voltage regulator to insure stable operation and non-interaction with the inverter stabilizing circuits.

In the meantime, the control voltage is applied to volt-time integral controller 66 to produce on line 47 timing pulses that are periodically recurring at a pulse repetition frequency six times the desired steady state frequency for the inverter output voltage, thereby establishing the inverter frequency at the desired level. In effect, controller 66 determines the time separation between successive timing pulses in response to the integrated amplitude of the control voltage. Note that both the amplitude and frequency of the inverter output voltage at steady state are determined by the same set point voltage. In a manner to be explained, the ratio of those two characteristics of the inverter voltage will be held fixed during steady state conditions and the volt-time integral applied to the motor terminals will be held constant between successive switchings of the inverter switches during both transient and steady state conditions. During steady state a given ratio of the inverter output voltage relative to the inverter frequency may be desirable for a variety of reasons, such as avoidance of overheating of motor 41, or to provide the motor with a constant torque output capability regardless of motor speed, or to optimize motor or inverter performance. As will be appreciated, by maintaining a constant volt-time integral on the motor during dynamically changing or transient conditions, the torque angle will be held relatively stable and well within the motor's stability limit.

To explain the oeration of volt-time integral controller 66, the control voltage is integrated in integrator 67 and the integrated voltage (which will be a positive-going ramp starting at zero volts) is applied to the non-inverting or (+) input of comparator 68, the inverting or (−) input of which receives a reference d-c voltage. When the output voltage of integrator 67 integrates up to the reference voltage, comparator 68 produces a timing pulse for application to line 47, the pulse also being fed back to effect reset of integrator 67 to zero in order to start a new integration cycle. In other words, when comparator 68 determines that the ramp-shaped integrator output voltage has reached the reference level, a timing pulse is developed to fire a new set of inverter SCR's into conduction, while at the same time the timing pulse resets the integrator 67 back to zero to commence another integration cycle. A constant volt-time integral is thus obtained between successive timing pulses, and consequently between successive inverter firings, the value of this volt-time integral being set by the level of the reference voltage applied to comparator 68, the reference level being selected for optimum performance. In effect, the frequency of the inverter is adjusted six times, or every 60°, during each inverter cycle. Every 60° of the inverter cycle, a determination is made as to what the inverter frequency should be in order to obtain a constant volt-time integral on the motor terminals. Since the motor terminal voltage is proportional to the d-c bus voltage, the integral of the d-c bus voltage is proportional to the stator flux in the motor; thus by maintaining the integral of the d-c bus voltage constant, the peak magnitude of the stator flux will be held approximately constant. Additionally, in the steady state the ratio of average motor terminal voltage to inverter frequency will be held constant regardless of the operating frequency or voltage. Hence, the so-called ratio of volts per hertz is maintained constant in the steady state.

It will thus be appreciated that the frequency of the inverter is directly proportional to the magnitude of the d-c bus voltage. When the bus voltage is relatively low, it takes a relatively long time for the integrator output voltage to reach the reference voltage, causing the timing pulses to have a relatively long time separation and the inverter to have a relatively low frequency. If the bus voltage is then increased, the time required for the integrator output voltage to reach the level of the reference voltage will be reduced, as a consequence of which the inverter frequency will be increased.

When there is a normal variation in the load demand, thereby dictating a different steady state motor speed, resistor 59 may be adjusted to vary the set point voltage to the extent necessary to change the d-c bus voltage and the control voltage as required to establish the frequency of the inverter voltage at the level necessary to drive motor 41 at the new desired speed. The new inverter output voltage, as established by the new bus voltage, and the new inverter frequency will have the same fixed ratio which is determined by the reference voltage applied to comparator 68.

More particularly, assume, for example, that a higher motor speed is desired. Resistor 59 will therefore be adjusted to increase the set point voltage, the error voltage thereby increasing from zero in a positive direction in order to decrease the firing angles of SCR's 12–17 in rectifier bridge 11. The d-c bus voltage and the control voltage therefore increase, causing the inverter frequency, and consequently the motor speed, to increase. When the new desired steady state motor speed is established and the system is in equilibrium with new steady state operating characteristics, the error voltage returns to zero volts. The firing angles of the SCR's 12–17 will, however, remain at their smaller angles to maintain the bus voltage at the new required higher level. As is well understood in the art, this is usually achieved by means of an integrator (not shown) within rectifier controller 18 which effectively stores the positively-increasing error voltage to hold the firing angles at their decreased values after the bus voltage reaches its new steady state level and the error voltage is reduced back to zero, where it always is under steady state conditions.

Conversely, if a lower motor speed is needed, the set point voltage is reduced, whereupon the error voltage increases from zero in a negative direction to increase the firing angles of SCR's 12–17 as necessary to lower the bus voltage, the control voltage and the inverter frequency to the extent required to obtain the new desired lower motor speed. Once again the error voltage is restored to zero when the new steady state conditions are established, but the firing angles will be held at their new larger angles stored in the integrator in rectifier controller 18.

Of course, while the motor speed may be changed by manually adjusting resistor 59, the set point voltage may be derived by sensing some parameter or characteristic of the system, in which the controlled inverter-motor system is incorporated, in order to automatically control the motor speed in response to that sensed information.

Without the present invention, in the event of a disturbance or transient condition, such as a sudden change of the mechanical load or load torque, the rotor of motor 41 could oscillate or hunt to such an extent that the torque angle could increase beyond the motor's stability limit, with the result that the motor would pull out of synchronism, developing potentially destructive currents and torques. With the invention, the rotating stator mmf is effectively controlled on a transient basis so that it will always be sufficiently close to the rotating rotor mmf so that the torque angle will be stabilized and held within the stability limit. The stator mmf is so controlled that the rotor mmf will never lag behind the stator mmf far enough to exceed the stability limit. In this way, the stator mmf is prevented from getting too far ahead of the rotor mmf. In effect, the stator mmf is dynamically adjusted so that it will lead or track ahead of the rotor mmf by a relatively constant angle well within the stability limit.

To explain, assume, for example, that the load torque on motor 41 is abruptly increased, the motor thereby tending to slow down as a consequence of which the torque angle tends to increase. When the load suddenly increases, the bus current, which is related to the motor current, rises sharply, the increased current being drawn from filter capacitor 23, which in turn lowers the bus voltage and the motor terminal voltage. Of course, during normal steady state operation no average current flows to or from the filter capacitor and all of the current flows through the inverter to the motor windings. Current will be pulled from the filter capacitor, however, during a sudden load increase, causing the capacitor voltage, and thus the bus voltage, to drop. It will therefore be noted that both the d-c bus voltage and the torque angle are subject to transient variations under transient conditions, the two characteristics tending to vary in opposite directions. As will be seen, since the transient changes in the bus voltage occur when the torque angle tends to vary, those transient changes are advantageously employed to effectively counter the tendency of the torque angle to suddenly change, thereby to stabilize the torque angle and hold it within the stability limit. The best results are achieved when the controlled d-c power supply 11, 21 exhibits some source regulation so that the d-c bus voltage will abruptly change when the load torque on the motor suddenly changes. Of course, the electrical size or capacitance of filter capacitor 23 determines how much the bus voltage will change in response to a given load change. The smaller the capacitance, the greater the bus voltage change. The greatest change occurs without any filter capacitor whatsoever. Thus, a filter capacitor is not essential to practice the invention.

Since the control voltage, developed at circuit junction 61, is a reduced-amplitude replica of the d-c bus voltage, the transient change, in a negative direction, in the bus voltage caused by the increased load torque will manifest as a transient variation in the same direction in the control voltage. The control voltage therefore contains information indicating any sudden torque angle change and also the direction in which that angle is changing. The transiently decreasing control voltage results in a longer integration time in volt-time integral controller 66 before the reference voltage is reached and comparator 68 generates a timing pulse for inverter control circuit 45. Hence, the inverter frequency is rapidly reduced when the control voltage tends to drop, as a consequence of which the rotating stator magnetic mmf tends to slow down to reduce the extent to which the torque angle tends to increase, thereby maintaining the torque angle relatively stable under transient conditions and well within the stability limit of the motor.

Of course, a sudden drop of the load torque would initiate an opposite correction. The motor tends to abruptly speed up and the torque angle tends to narrow. The d-c bus current flowing through inverter 25 to motor 41 abruptly decreases, the inductor current flowing into filter capacitor 23 to charge that capacitor to a voltage significantly higher than the steady state bus voltage. The dynamically increasing bus voltage results in a shorter time separation between the timing pulses to rapidly increase the inverter frequency to stabilize the torque angle.

It will thus be apparent that volt-time integral controller 66 functions as a stabilizing means which responds to any transient variation in the control voltage and effectively provides transient control over the inverter to rapidly change the inverter frequency so that it will vary in step with and in the same direction as the transient change in the bus voltage, thereby holding the torque angle relatively stable and preventing it from exceeding the motor's stability limit. The stabilizing means provides both static and dynamic control over the inverter frequency to maintain the ratio of the inverter output voltage relative to the inverter frequency constant at all times during transient as well as during static or steady state conditions. In effect, the torque angle is held within the stability limit by maintaining a constant volt-time integral on the motor terminals between successive firings of the inverter SCR's.

In a voltage source inverter employing both switching elements 31–36 and reactive diodes 51–56 and 180° gate signals, the d-c bus voltage is approximately proportional to the voltage appearing across the motor terminals. Although the important voltage is the motor terminal voltage, the use of the d-c bus voltage as the control voltage is satisfactory because of the proportionality just described. There is some discrepancy in the proportionality due to voltage drops in the semiconductors, stray wiring loss, etc. If more accurate control is required, then the rectified terminal voltage of the motor may be used as indicated by FIG. 2.

Hence, as shown in FIG. 2, the invention may be practiced by adjusting the inverter frequency in response to transient changes in the inverter output voltage. The three-phase alternating voltage produced by inverter 25 is rectified by rectifier 71 to develop a d-c voltage which will have substantially the same magnitude as the d-c bus voltage applied to the inverter. Moreover, any transient change in the d-c bus voltage will manifest itself as a transient change in the d-c output voltage of rectifier 71. This output voltage is stepped down by the voltage divider 72, 73 to provide at circuit junction 74 a control voltage which is essentially the same as the control voltage developed in the FIG. 1 embodiment. Thus, the control voltage in FIG. 2 would be applied to comparator 64 and to integrator 67 and the system will operate substantially the same as described in connection with FIG. 1.

In a motor-commutated inverter, as disclosed by my aforementioned copending patent application, consisting of six SCR's and six reactive diodes or with only six SCR's, with either configuration having 120° gate signals, the proportionality between the d-c bus voltage and the motor voltage may be lost at light loads when discontinuous conduction may occur. In this case, the use of the rectified motor voltage, as shown in FIG. 2, is the preferred method of synchronization.

Figure 3:
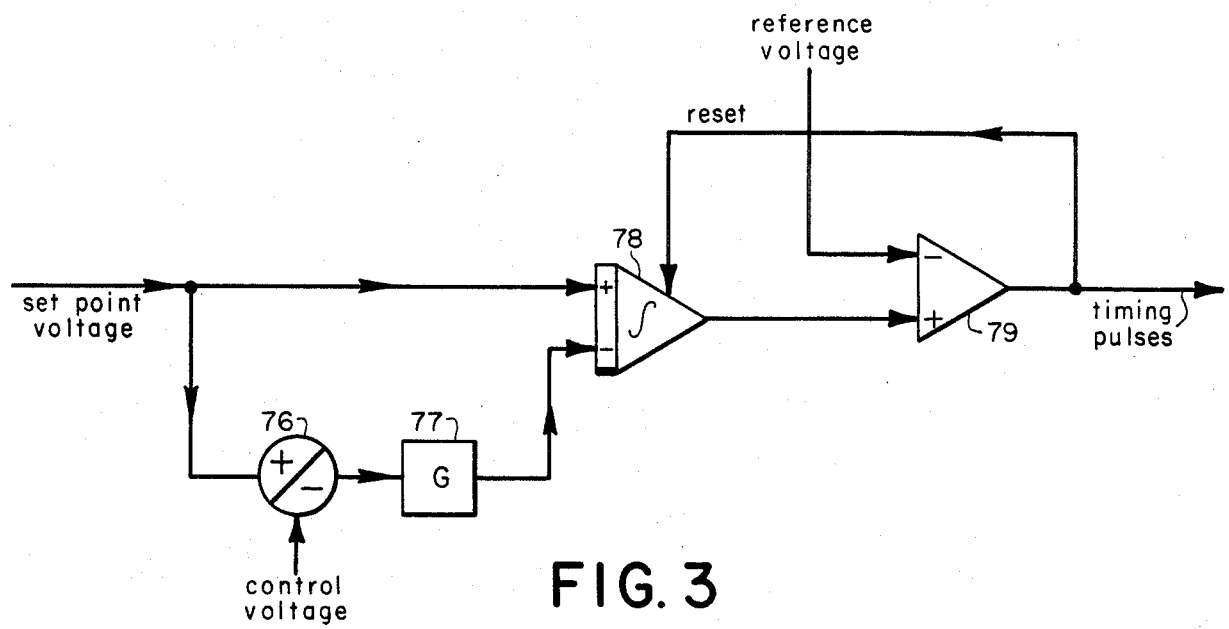
FIG. 3 shows a portion of the control system of FIG. 1 modified in accordance with a further embodiment of the invention.
Figure 4:
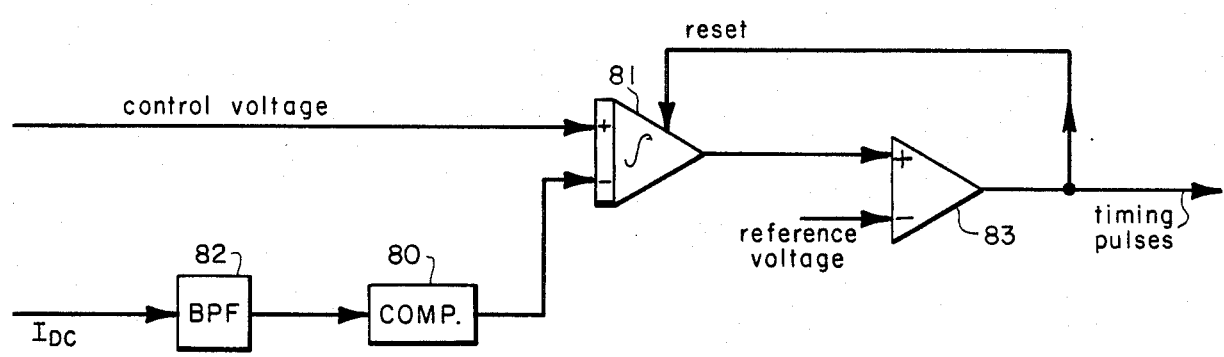
FIG. 4 shows a portion of the control system of FIG. 1 modified in accordance with still another embodiment of the invention.

Alternative synchronization schemes are shown in FIGS. 3 and 4. These offer advantages in certain applications. The control voltage for these circuits may be derived from either the d-c bus or the motor voltage as previously discussed. Referring first to FIG. 3, it is seen that the set point voltage is applied to comparator 76 and integrator 78. The control voltage is compared to the set point voltage by comparator 76 and any difference is multiplied by gain block 77 and applied to the (−) input terminal of integrator 78. The output of integrator 78 is compared to a reference level by comparator 79. The output of this comparator resets the integrator 78 to zero.

Operation of the FIG. 3 circuit is as follows: If for the moment it is assumed that the set point voltage and the control voltage are equal, then the output of comparator 76 is zero and no voltage is applied to the (−) input terminal of integrator 78. In this event, the output of integrator 78 is the integral of the set point voltage and when this voltage reaches the reference level, comparator 78 produces an output pulse and causes the integrator output to reset to zero. Thus, the output of the integrator is a series of ramp voltages and the resetting of the integrator may be taken as a signal to gate the SCR's. The output of comparator 79 therefore provides the timing pulses for control circuit 45. Operation in this manner is identical to that of the circuits of FIG. 1 and 2.

If it is now assumed that the control voltage decreases (indicating that the d-c bus voltage or motor voltage has decreased), then a positive error voltage will appear at the output of comparator 76 and will be multiplied by gain block 77 and subtracted from the set point voltage applied to integrator 78. As a result, the output of integrator 78 will take a longer time to reach the reference level and the inverter frequency will subsequently be decreased. As previously explained, this is in the proper direction to maintain the torque angle. A similar action occurs should the control voltage increase. The advantage of this circuit is that a gain G may be set by gain block 77 that is only active during the transient condition. Hence, in effect, the steady state "volts/hz" may be set independently of the transient "volts/hz." It has been found advantageous to use this circuit in some applications.

Referring now to FIG. 4, it is seen that in this configuration the control voltage is applied to integrator 81. The output of integrator 81 is applied to comparator 83 along with a reference voltage. The output of comparator 83 functions to reset integrator 81 whenever the output of integrator 81 equals the reference voltage. Additionally, a signal proportional to the d-c link or bus current is applied to the bandpass filter 82. The output of the bandpass filter is applied to the (−) input terminal of integrator 81 through compensation circuit 80.

In describing the operation of the circuit, it will be assumed for the moment that the signal proportional to the d-c bus current is constant. The output of the bandpass filter 82 will therefore be zero and, consequently, the voltage applied to the (−) input terminal of integrator 81 will be zero. In this case, the output of integrator 81 is the integral of the control voltage. When this integrated voltage equals the reference voltage, the integrator is reset. The operation in this manner is identical to that previously explained in FIGS. 1, 2 and 3, comparator 83 producing timing pulses for application to inverter control circuit 45.

If now a variation of the d-c current occurs at a frequency within the bandpass characteristics of the filter 82, then a signal is applied to the (−) input terminal of integrator 81. For example, if the motor load increases causing the motor to slow down, the d-c bus or link current will increase; hence, the output of filter 82 will be positive and result in a subtraction of voltage from the control voltage that is integrated by integrator 81. Therefore, the output of the integrator will take longer to reach the reference level and the inverter frequency will be decreased to preserve the torque angle.

The circuit of FIG. 4 is useful when operating the inverter from a very solid source. In such applications, the d-c bus or motor voltage may not change appreciably and the aforementioned circuits may not function effectively as they require a change of voltage to operate. Since it is the change in current that attempts to change the voltage, the circuit of FIG. 4 will operate satisfactorily even if no appreciable voltage change occurs.

Figure 5:
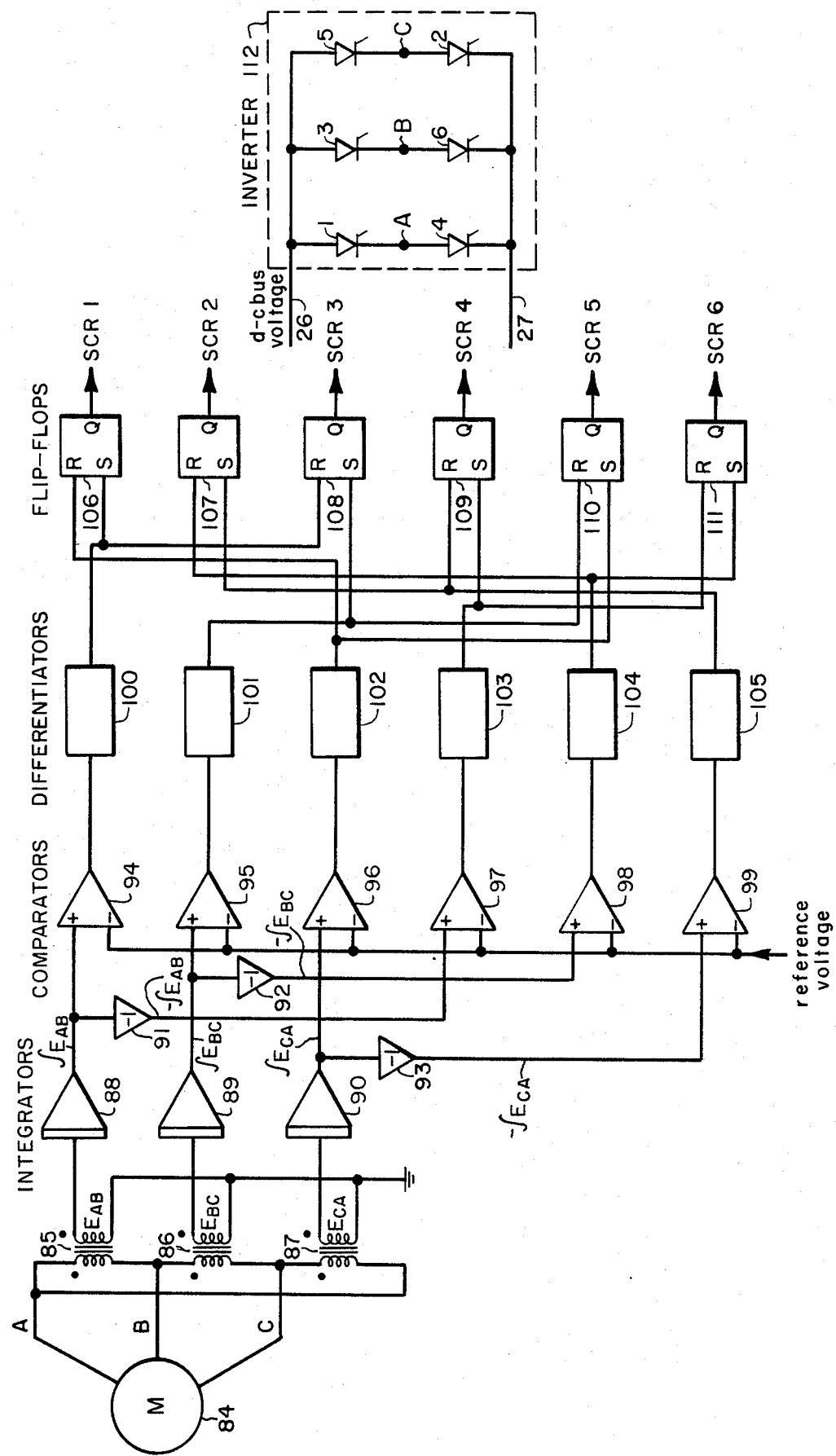
FIG. 5 shows an alternate stabilization technique as an additional embodiment of the invention.

FIG. 5 illustrates another method of synchronizing the damperless motor to the inverter output. This circuit may be used with voltage source inverters of either the forced or motor commutated type with the latter type including either six SCR's or six SCR'S and reactive diodes as previously discussed. Referring to FIG. 5, the line-to-line voltage of motor 84 is sensed by three isolation transformers 85, 86, 87. Although three single phase transformers are shown in the figure, a single three-phase transformer or various arrangements of differential amplifiers may be used as sensing means. The three output voltages $E_{AB}$, $E_{BC}$ and $E_{CA}$ appearing on the secondaries of the transformers are fed to integrators 88, 89, 90 whose outputs then represent the integrated line-to-line voltages. The outputs of the integrators are fed directly to comparators 94, 95, 96 and through inverters 91, 92 and 93 to comparators 97, 98, 99. The square wave outputs of these comparators are differentiated in differentiators 100–105 to produce pulses to trigger flip-flops 106–111. The outputs of these flip-flops supply gate driver circuitry which, in turn, gate SCR's 1–6 of the inverter 112 in FIG. 5. The circuit terminals or junctions marked A, B and C in the inverter connect, of course, to lines A, B and C, respectively, of motor 84.

In operation, the integrated line-to-line voltage is compared with a reference signal. When the integrated voltage equals the reference value, the comparator produces an output which, after differentiation, causes a flip-flop to change state and initiates the gating of an SCR. The gate signal is terminated 120° later by a pulse coming from a second differentiator. In this manner, and just as in the circuits described previously the volt-time integral of the voltage applied to the motor is maintained constant every 60° of the cycle. Hence, the same stabilizing effect is obtained.

It was previously stated that the compensation circuits would function even if the inverter were operating from a fixed d-c voltage source. That is, a source whose voltage is essentially constant (except for the required voltage regulation) independent of motor speed. Operation in this mode is usually undertaken above base speed where the voltage is held constant and the frequency is increased. Since the V/f (volts/hz) ratio will be decreasing, the torque capability of the machine decreases with the speed and this region is usually referred to as the constant power region.

To operate the circuit of FIG. 1 in the fixed voltage mode, the set point voltage is maintained fixed and speed variation is accomplished by changing the reference voltage. For example, with a fixed input to the integrator 67, decreasing the reference voltage causes the integrated voltage on the output of integrator 67 to reach the reference voltage sooner and comparator 68 produces an output pulse sooner. Therefore, the frequency is raised, while the V/f ratio is reduced. At any given reference voltage, the stabilization action is identical to that previously discussed. Similar operation is obtained by the compensation circuits of FIGS. 3, 4 and 5 by maintaining the set point fixed and varying the reference voltgage.

While particular embodiments of the invention have been shown and described, modifications may be made, and it is intended in the appended claims to cover all such modifications as may fall within the true spirit and scope of the invention.

I claim:

1. A control system for controlling and stabilizing the operation of a damperless synchronous motor driven by the output a-c voltage developed by a voltage source inverter from an adjustable d-c bus voltage received over a d-c bus from a controlled d-c power supply having a low internal impedance, both the d-c bus voltage and the torque angle in the motor being subject to transient variations under transient conditions, said control system comprising:

means for establishing the amplitude and frequency of the inverter output voltage at desired steady state levels;

means for developing a control voltage which is a function of the d-c bus voltage or motor voltage and includes information indicating any sudden torque angle change;

and stabilizing means, controlled by said control voltage, for rapidly adjusting the inverter frequency anytime the torque angle tends to suddenly vary in order to reduce the extent to which the angle tends to change, thereby maintaining the torque angle relatively stable under transient conditions and within the stability limit of the motor.

2. A control system according to claim 1 wherein the ratio of the inverter output voltage with respect to the inverter frequency is maintained relatively constant by said stabilizing means under steady state conditions as well as under transient conditions.

3. A control system according to claim 1 and including means for providing a set point voltage representing the desired steady state amplitude and also the desired steady state frequency for the a-c voltage produced by the inverter, and wherein the set point voltage is utilized to establish the inverter output voltage at the desired steady state amplitude and frequency levels.

4. A control system according to claim 3 and including means for comparing the set point voltage with said control voltage to produce an error voltage which is a function of the difference between the compared voltages, wherein the error voltage is utilized to establish the inverter output voltage at the desired steady state amplitude, and wherein said stabilizing means provides both static and dynamic control over the inverter frequency to maintain the ratio of the inverter output voltage relative to the inverter frequency constant at all times during transient as well as during static conditions.

5. A control system according to claim 1 wherein said control voltage is produced from and is directly proportional to the d-c bus voltage, the sudden torque angle changes being indicated by transient variations in said control voltage.

6. A control system according to claim 1 wherein a variable mechanical load is driven by the damperless synchronous motor, sudden load torque variations tending to cause transient changes in both the d-c bus voltage and the torque angle, and wherein said stabilizing means effectively counters the tendency of the torque angle to suddenly change in response to an abrupt load torque variation, thereby holding the torque angle relatively stable.

7. A control system according to claim 1 wherein the torque angle and the d-c bus voltage tend to vary in opposite directions during transient conditions, wherein said control voltage is directly proportional to the d-c bus voltage during transient as well as during steady state conditions, transient changes in the bus voltage thereby being manifested as transient changes in the same direction in said control voltage, and wherein said stabilizing means responds to the transient variations in said control voltage and effectively provides transient control over the inverter to rapidly change the inverter frequency so that it will vary in step with and in the same direction as the transient changes in the bus voltage, thereby holding the torque angle relatively stable and preventing it from exceeding the motor's stability limit.

8. A control system according to claim 1 wherein said control voltage is produced by rectifying the inverter output voltage.

9. A control system according to claim 1 wherein the controlled d-c power supply exhibits some source regulation so that the d-c bus voltage will abruptly change when the load torque on the motor suddenly changes.

10. A control system according to claim 1 wherein the controlled d-c power supply includes a phase-controlled SCR rectifier bridge and a filter for developing the d-c bus voltage from a-c energy received from an a-c power source.

11. A control system according to claim 1 wherein said stabilizing means includes a volt-time integral controller and maintains, both statically and dynamically, a constant value of volt-time integral on the motor windings and hence a fixed ratio of the inverter output voltage relative to the inverter frequency.

12. A control system according to claim 1 wherein said stabilizing means effectively maintains a constant volt-time integral on the motor terminals between successive triggering pulses applied to the inverter in order to hold the torque angle within the stability limit even though the load torque or the bus voltage or the inverter frequency may experience transient variations.

13. A control system according to claim 1 wherein said stabilizing means effectively compares the inverter output voltage with the inverter frequency several times during each operating cycle of the inverter and, in response to each comparison, adjusts the inverter frequency so as to maintain at all times a constant value of volt-time integral on the motor windings and hence a fixed ratio of the inverter output voltge relative to the inverter frequency, thereby holding the torque angle relatively stable and within the stability limit under dynamically changing conditions as well as under static conditions.

14. A control system according to claim 1 wherein said stabilizing means includes a volt-time integral controller which integrates said control voltage and compares the integrated voltage with a reference voltage, representing a desired constant volt-time integral, to produce a timing pulse in response to each comparison, several such timing pulses being produced during each cycle of operation of the inverter and these timing pulses being utilized to trigger the inverter at the instants required to obtain a constant volt-time integral between successive triggerings, the inverter frequency thereby being determined at all times, during transients as well as during steady state, by the amplitude of the d-c bus voltage.

15. A control system according to claim 14 wherein said control voltage is integrated, and the integrated voltage is compared, six times during each operating cycle of the inverter in order to effectively adjust the inverter frequency every 60° of each operating cycle to maintain precise tracking of the inverter frequency to the instantaneous amplitude of the d-c bus voltage so that the torque angle is held relatively stable and within the stability limit despite transient variations of the load torque or the bus voltage or the inverter frequency.

16. A control system for controlling and stabilizing the operation of a damperless synchronous motor driven by the output a-c voltage developed by a voltage source inverter, having a series of solid state switching devices, from an adjustable d-c bus voltage received over a d-c bus from a controlled d-c power supply having a low internal impedance, the amplitude of the inverter output a-c voltage being determined by the magnitude of the d-c bus voltage while the frequency of the inverter voltage is determined by the frequency of triggering pulses applied to the switching devices in the inverter, both the d-c bus voltage and the torque angle in the motor being subject to transient variations in opposite directions under transient conditions, said control system comprising:

means for providing a set point voltage representing a desired steady state amplitude and a desired steady state frequency for the a-c voltage produced by the inverter;

a comparator for comparing the set point voltage with a control voltage, which is directly proportional to the d-c bus voltage and has transient amplitude variations corresponding to transient changes in the d-c bus voltage, to produce an error voltage which is a function of the difference between the compared voltages;

a controller, operated in response to the error voltage, for controlling the d-c power supply to adjust the d-c bus voltage to the steady state level required to establish the inverter output a-c voltage at the desired steady state amplitude;

a volt-time integral controller, operated in response to said control voltage, for producing periodically recurring timing pulses having time separations determined by the instantaneous amplitude of said control voltage;

and an inverter control circuit, operated in response to said timing pulses, for supplying triggering pulses to the switching devices in the inverter to establish the inverter output a-c voltage at the desired steady state frequency, thereby setting the motor speed at a desired level, said control voltage causing the inverter frequency to vary with, and in the same direction as, the d-c bus voltage transient variations in order to control the torque angle and maintain it relatively stable within the stability limit of the motor, despite the presence of relatively wide and abrupt changes of load torque or d-c bus voltage or inverter frequency.

17. A control system according to claim 1 and including means for setting the steady state inverter voltage-/inverter frequency ratio independently of the transient inverter voltage/inverter frequency ratio.

18. A control system for controlling and stabilizing the operation of a damperless synchronous motor driven by the output a-c voltage developed by a voltage source inverter from an adjustable d-c bus voltage received over a d-c bus from a controlled d-c power supply having a low internal impedance, both the motor voltage and the torque angle in the motor being subject to transient variations under transient conditions, said control system comprising:

means for establishing the amplitude and frequency of the inverter output voltage at desired steady state levels;

means for developing a control voltage which is a function of the motor voltage and includes information indicating any sudden torque angle change;

and stabilizing means, controlled by said control voltage, for rapidly adjusting the inverter frequency anytime the torque angle tends to suddenly vary in order to reduce the extent to which the angle tends to change, thereby maintaining the torque angle relatively stable under transient conditions and within the stability limit of the motor.

19. A control system for controlling and stabilizing the operation of a damperless synchronous motor driven by the output a-c voltage developed by a voltage source inverter from an adjustable d-c bus voltage received over a d-c bus from a controlled d-c power supply having a low internal impedance, both the d-c bus current and the torque angle in the motor being subject to transient variations under transient conditions, said control system comprising:

means for establishing the amplitude and frequency of the inverter output voltage at desired steady state levels;

means for developing a control voltage which is a function of the d-c bus current and includes information indicating any sudden torque angle change;

and stabilizing means, controlled by said control voltage, for rapidly adjusting the inverter frequency anytime the torque angle tends to suddenly vary in order to reduce the extent to which the angle tends to change, thereby maintaining the torque angle relatively stable under transient conditions and within the stability limit of the motor.

20. A control system for controlling and stabilizing the operation of a damperless synchronous motor driven by the output a-c voltage developed by a voltage source inverter from a d-c bus voltage received over a d-c bus from a d-c power supply having a low internal impedance, both the d-c bus voltage and the torque angle in the motor being subject to transient variations under transient conditions, said control system comprising:

means for establishing the amplitude and frequency of the inverter output voltage at desired steady state levels;

means for developing a control voltage which is a function of the d-c bus voltage or motor voltage and includes information indicating any sudden torque angle change;

stabilizing means, controlled by said control voltage, for rapidly adjusting the inverter frequency anytime the torque angle tends to suddenly vary in order to reduce the extent to which the angle tends to change, thereby maintaining the torque angle relatively stable under transient conditions and within the stability limit of the motor;

and means for controlling said stabilizing means to control the steady state operating frequency of the inverter.

21. A control system for controlling and stabilizing the operation of a damperless synchronous motor driven by the output a-c voltage developed by a voltage source inverter from an adjustable d-c bus voltage received over a d-c bus from a controlled d-c power supply having a low internal impedance, both the motor voltage and the torque angle in the motor being subject to transient variations under transient conditions, said control system comprising:

means for integrating the motor voltage;

means for comparing the integrated motor voltage with a reference voltage, representing a desired ratio of the inverter output voltage relative to the inverter frequency, to produce triggering signals for the inverter;

and means for utilizing the triggering signals to control the inverter to rapidly adjust the inverter frequency anytime the torque angle tends to suddenly vary in order to reduce the extent to which the angle tends to change, thereby maintaining the torque angle relatively stable under transient conditions and within the stability limit of the motor.

22. A control system for controlling and stabilizing the operation of a synchronous motor driven by the output a-c voltage developed by a voltage source inverter from an adjustable d-c bus voltage received over a d-c bus from a controlled d-c power supply having a low internal impedance, both the d-c bus voltage and the torque angle in the motor being subject to transient variations under transient conditions, said control system comprising:

means for establishing the amplitude and frequency of the inverter output voltage at desired steady state levels;

means for developing a control voltage which is a function of the d-c bus voltage or motor voltage and includes information indicating any sudden torque angle change;

and stabilizing means, controlled by said control voltage, for rapidly adjusting the inverter frequency anytime the torque angle tends to suddenly vary in order to reduce the extent to which the angle tends to change, thereby maintaining the torque angle relatively stable under transient conditions and within the stability limit of the motor.

* * * * *